United States Patent
Mou

(10) Patent No.: US 10,582,549 B2
(45) Date of Patent: Mar. 3, 2020

(54) WIRELESS HOTSPOT OPERATION METHOD

(71) Applicant: PEGATRON CORPORATION, Taipei (TW)

(72) Inventor: Ying-Chieh Mou, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/174,309

(22) Filed: Oct. 30, 2018

(65) Prior Publication Data

US 2019/0208551 A1 Jul. 4, 2019

(30) Foreign Application Priority Data

Jan. 3, 2018 (TW) .............................. 107100231 A

(51) Int. Cl.
| | |
|---|---|
| *H04W 76/10* | (2018.01) |
| *H04L 29/12* | (2006.01) |
| *H04L 12/773* | (2013.01) |
| *H04W 88/08* | (2009.01) |

(52) U.S. Cl.
CPC .............. *H04W 76/10* (2018.02); *H04L 45/60* (2013.01); *H04L 61/1552* (2013.01); *H04L 61/6022* (2013.01); *H04W 88/08* (2013.01)

(58) Field of Classification Search
CPC .............................. H04W 24/02; H04W 40/12
See application file for complete search history.

(56) References Cited

U.S. PATENT DOCUMENTS

| 6,226,277 | B1 | 5/2001 | Chuah | |
| 2010/0174869 | A1* | 7/2010 | Gorobets | G06F 12/0246 |
| | | | | 711/135 |
| 2013/0210379 | A1* | 8/2013 | Cloutier | H04W 76/10 |
| | | | | 455/405 |
| 2018/0359649 | A1* | 12/2018 | Lelkens | H04W 24/02 |
| 2019/0238444 | A1* | 8/2019 | John | H04L 12/5692 |

FOREIGN PATENT DOCUMENTS

| TW | 201431413 A | 8/2014 |
| TW | 201611647 A | 3/2016 |

* cited by examiner

*Primary Examiner* — Melanie Jagannathan
(74) *Attorney, Agent, or Firm* — McClure, Qualey & Rodack, LLP

(57) ABSTRACT

A wireless hotspot operation method used in a wireless hotspot device includes the steps described below. A remote device is wirelessly connected to the wireless hotspot device and whether a physical address of the remote device exists in an address table is determined, wherein the address table includes a plurality of entries each configured to record a connected device physical address of a connected device. When the physical address does not exist in the address table, whether a capacity of the address table exceeds a threshold value is determined. When the capacity exceeds the threshold value, one of the connection parameters of the connected device satisfying a removing criterion is determined. The connected device physical address of the connected device with the connection parameter satisfying the removing criterion is removed from the address table. The physical address of the remote device is added to the address table.

9 Claims, 3 Drawing Sheets

WIRELESS HOTSPOT OPERATION METHOD

CROSS-REFERENCE TO RELATED APPLICATION

This application claims the priority benefit of Taiwan application serial no. 107100231, filed on Jan. 3, 2018. The entirety of the above-mentioned patent application is hereby incorporated by reference herein and made a part of this specification.

BACKGROUND

Field Technology

The present disclosure relates to network transmission technologies, and particularly relates to a wireless hotspot operation method.

Description of Related Art

Network service providers often integrate a wireless hotspot into a cable modem or a cable modem router. Users can use mobile devices to perform wireless data transmission with the wireless hotspots, and further transmit packets via the cable modem. However, the number of devices that a cable modem can connect to is limited by hardware resources. In this situation, devices connected to the wireless hotspot later may no longer be able to transmit packets and the utilization of the wireless hotspots cannot be improved efficiently.

SUMMARY

The present disclosure provides a wireless hotspot operation method, in which the wireless hotspot operation method is applied to a wireless hotspot device. The wireless hotspot operation method includes: determining whether a physical address of a remote device, wirelessly connected to the wireless hotspot device, exists in an address table, wherein the address table comprises a plurality of entries, and each of the entries is configured to record a connected device physical address of a connected device; determining whether a capacity of the address table is larger than a threshold value when the physical address does not exist in the address table; determining whether one of a plurality of connection parameters of the connected device satisfies a removing criterion when the capacity of the address table is larger than the threshold value; removing the connected device physical address of the connected device from the address table if the one of the connection parameters of the connected device satisfies the removing criterion; and adding the physical address of the remote device to the address table.

The advantage of applying the present disclosure is that the wireless hotspot operation method can enable the wireless hotspot device to remove the physical address of the connected device efficiently and to allow a new remote device to transmit packets via the wireless hotspot device according to the connection parameters of the connected devices when the capacity of the address table is insufficient. The data transmission of the remote device will thus not be limited to the capacity of the address table of the wireless hotspot device, and the utilization of the wireless hotspot device can also be improved greatly.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the disclosure.

DESCRIPTION OF THE EMBODIMENTS

Figure 1:
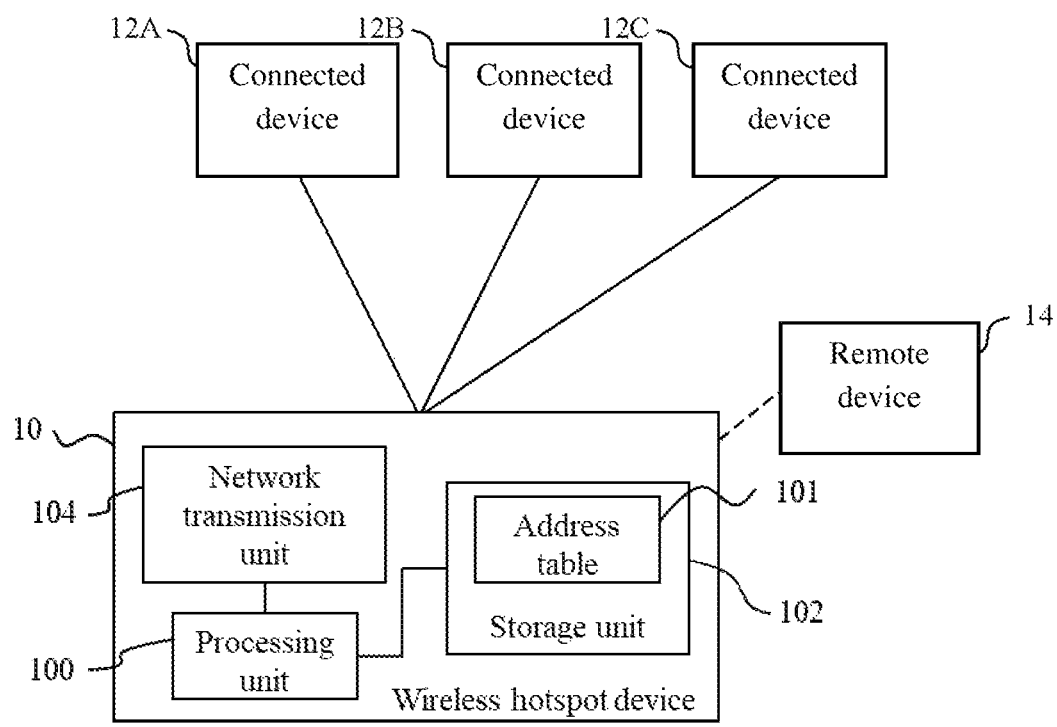
FIG. 1 is a schematic diagram of a wireless hotspot device, connected devices and a remote device according to an embodiment of the present disclosure.

Reference is made to FIG. 1. FIG. 1 is a schematic diagram of a wireless hotspot device 10, connected devices 12A-12C and a remote device 14 according to an embodiment of the present disclosure.

In an embodiment, the wireless hotspot device 10 is configured to communicate with external electronic devices for packet transmission, for example, the wireless hotspot device 10 is wirelessly connected to the connected devices 12A-12C to perform wireless communication.

In an embodiment, the wireless hotspot device 10 is integrated in a cable modem or a cable modem router, and the wireless hotspot device 10 includes, but not limited to, a processing unit 100, a storage unit 102 and a network transmission unit 104, in which the network transmission unit 104 is configured to perform data transmission and the processing unit 100 is configured to access data and to process the data.

In an embodiment, the storage unit 102 is, but not limited to, a cache memory, and is configured to store an address table 101. When the connected devices 12A-12C perform packet transmission via the wireless hotspot device 10, the wireless hotspot device 10 stores physical addresses of the connected devices 12A-12C in the address table 101, and transmits the packets to, but not limited to, a wide-area network (WAN).

In an embodiment, the physical addresses of the connected devices 12A-12C are media access control (MAC) addresses. The content of the address table 101 is a content addressable memory (CAM) table with a number of entries, and each entry is configured to store a physical address of a connected device.

However, the address table 101 can store a limited number of physical addresses of the connected devices due to the limitation of the hardware storage capacity. If the physical address of the remote device 14 does not exist in the address table 101, the wireless hotspot device 10 needs to guarantee the remote device 14 can communicate via the wireless hotspot device 10 when the remote device 14 wants to transmit packets via the wireless hotspot device 10 to improve the utilization of the wireless hotspot device 10.

The operation method of the wireless hotspot device 10 will be described in more detail as follows.

Figure 2:
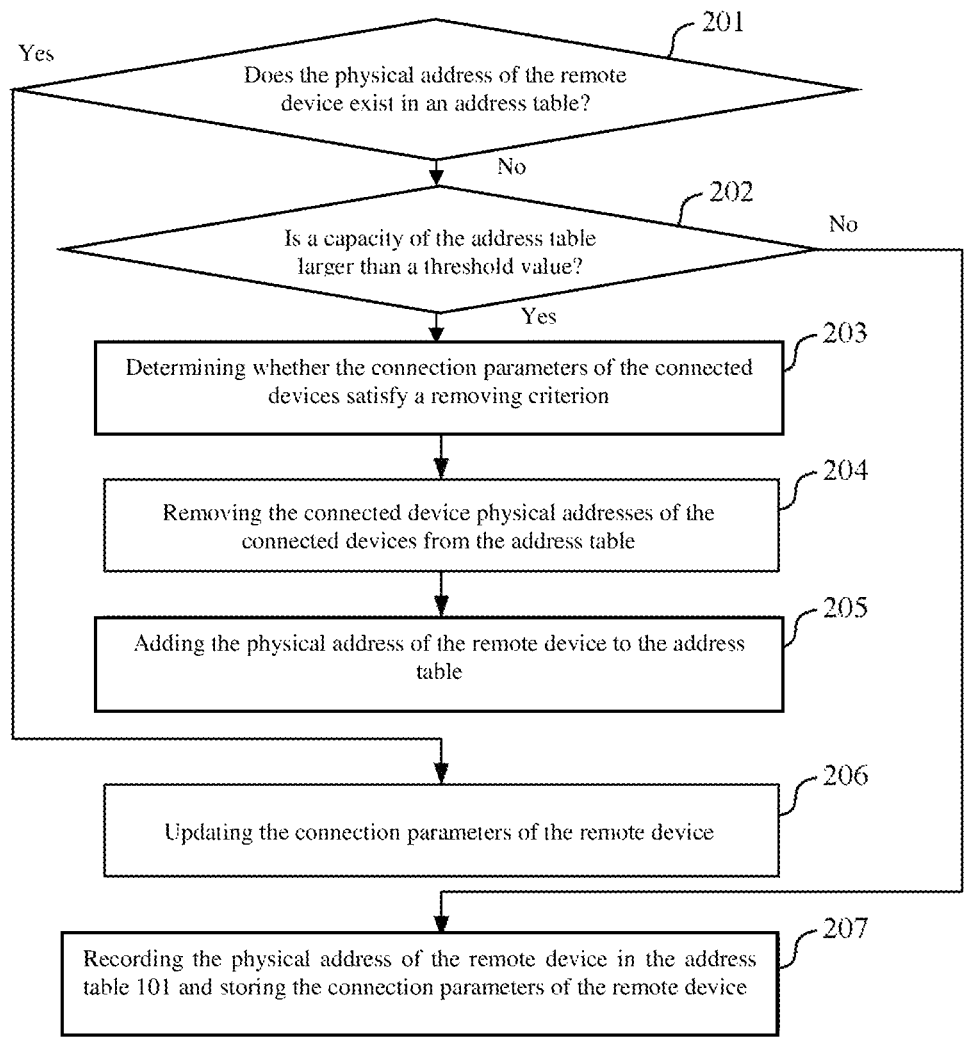
FIG. 2 is a flow chart of a wireless hotspot operation method according to an embodiment of the present disclosure.

Reference is made to FIG. 2. FIG. 2 is a flow chart of a wireless hotspot operation method 200 according to an embodiment of the present disclosure.

The wireless hotspot operation method 200 can be applied to the wireless hotspot device 10 as shown in FIG. 1. The wireless hotspot operation method 200 includes the following steps. It should be noted that, the steps are not recited in the sequence in which the steps are performed. That is, unless the sequence of the steps is expressly indicated, the sequence of the steps is interchangeable, and all or part of the steps may be simultaneously, partially simultaneously, or sequentially performed.

In step 201, the wireless hotspot device 10, wirelessly connected to the remote device 14, determines whether the physical address of the remote device 14 exists in the address table 101.

In an embodiment, the processing unit 100 of the wireless hotspot device 10 is connected to the remote device 14 by receiving a connection request or a packet transmission request from the remote device 14 by the network transmission unit 104.

In step 202, when the physical address does not exist in the address table 101, the processing unit 100 determines whether a capacity of the address table 101 is larger than a threshold value.

In step 203, when the capacity of the address table 101 is larger than the threshold value, the wireless hotspot device 10 determines whether the connection parameters of the connected devices 12A-12C satisfy a removing criterion.

In an embodiment, the processing unit 100 presets a selecting rule and determines whether the connection parameters of the connected devices 12A-12C satisfy the removing criterion according to the selecting rule.

In an embodiment, the connection parameters include an idle time, a continuous connection time, signal strength, a signal to noise ratio (SNR), a connection level or a combination thereof.

The idle time is the time the connected devices 12A-12C do not perform data transmission, the continuous connection time is the total time the connected devices 12A-12C and the wireless hotspot device 10 are continuously connected, the signal strength is, but not limited to, for example, Received Signal Strength Indicators (RSSIs) of the connected devices 12A-12C when connected to the wireless hotspot device 10.

The signal to noise ratios of the connected devices 12A-12C are the ratios of the signal and the noise when connected to the wireless hotspot device 10, and the connection level is set according to a specific classification mechanism. For example, the connection level can be ranked according to, for example, but not limited to, user's payment status. The higher the payment, the higher the connection level.

Figure 3:
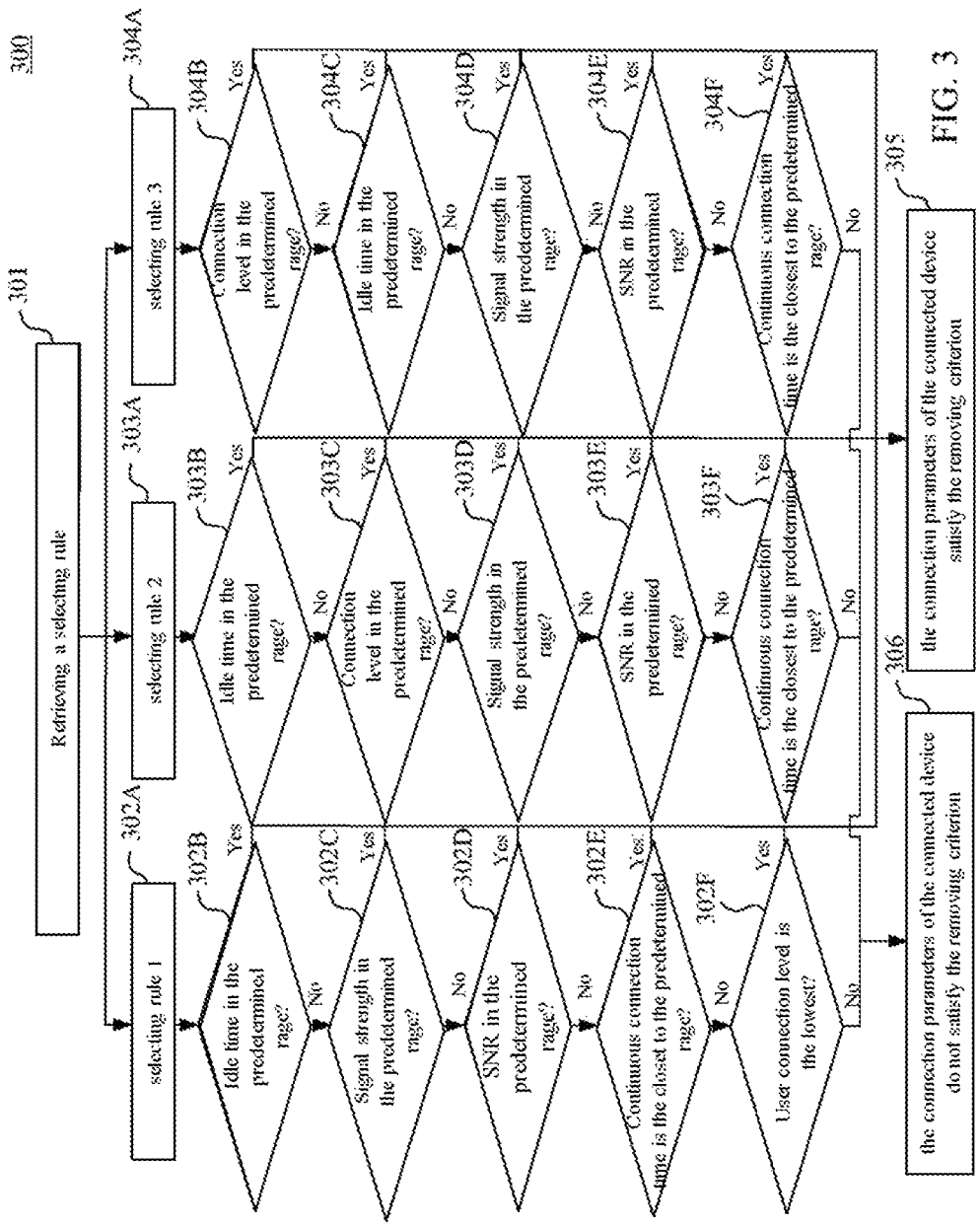
FIG. 3 is a flow chart of a sub-process of a wireless hotspot operation method according to an embodiment of the present disclosure.

Reference is made to FIG. 3. FIG. 3 is a flow chart of a sub-process 300 of a wireless hotspot operation method 200 according to an embodiment of the present disclosure. The sub-process 300 is an embodiment of the present disclosure which includes steps of determining whether the connection parameters of the connected devices satisfy the removing criterion by the wireless hotspot device. The connected device 12A will be described below as an example.

In step 301, the processing unit 100 retrieves a selecting rule, in which the selecting rule includes an order of determining the connection parameters of the connected device 12A.

In an embodiment, the processing unit 100 determines whether each of the connection parameters is within a corresponding predetermined range in an order according to the selecting rule.

For example, the processing unit 100 performs a selecting rule one in step 302A and performs decision-making in an order according to the idle time, the signal strength, the signal to noise ratio and the continuous connection time of the connected device 12A in step 302B to step 302E to determine whether the idle time is larger than an predetermined idle time; to determine whether the signal strength is smaller than a predetermined strength; to determine whether the signal to noise ratio is smaller than a predetermined signal to noise ratio; and to determine whether the continuous connection time is larger than a predetermined connection time.

When one of the connection parameters is within the corresponding predetermined range, in step 305, the processing unit 100 determines the one of the connection parameters of the connected device 12A satisfies the removing criterion.

In detail, when the processing unit 100 determines the idle time of the connected device 12A is larger than the predetermined idle time in step 302B, the idle time of the connected device 12A is determined to satisfy the removing criterion, and steps 302C-302E will not be performed. The minimum value of the predetermined range of the idle time can be set to be equal to the predetermined idle time, and the maximum value of the predetermined range of the idle time can be set to be larger than the predetermined idle time.

When the processing unit 100 determines the idle time of the connected device 12A is smaller than the predetermined idle time in step 302B and determines the signal strength is smaller than the predetermined strength in step 302C, the signal strength of the connected device 12A is determined to satisfy the removing criterion, and steps 302D-302E will not be performed. The maximum value of the predetermined range of the signal strength can be set to be equal to the predetermined strength, and minimum value of the predetermined range of the signal strength can be set to be smaller than the predetermined strength.

When the processing unit 100 determines the idle time of the connected device 12A is smaller than the predetermined idle time in step 302B, determines the signal strength is larger than the predetermined strength in step 302C, and determines the signal to noise ratio of the connected device 12A is smaller than the predetermined signal to noise ratio in step 302D, the signal to noise ratio of the connected device 12A is determined to satisfy the removing criterion, and step 302E will not be performed. The maximum value of the predetermined range of the signal to noise ratio can be set to be equal to the predetermined signal to noise ratio, and the minimum value of the predetermined range of the signal to noise ratio can be set to be smaller than the predetermined signal to noise ratio.

When the processing unit 100 determines the idle time of the connected device 12A is smaller than the predetermined idle time in step 302B, determines the signal strength is larger than the predetermined strength in step 302C, determines the signal to noise ratio of the connected device 12A is larger than the predetermined signal to noise ratio in step 302D, and determines the continuous connection time of the connected device 12A is larger than the predetermined connection time in step 302E, the continuous connection time of the connected device 12A is determined to satisfy the removing criterion. The minimum value of the predetermined range of the continuous connection time can be set to be equal to the predetermined connection time, and the maximum value of the predetermined range of the continuous connection timed can be set to be larger than the predetermined connection time.

The processing unit 100 can perform the same decision-making procedure on the connected devices 12B and 12C, and will not be described herein.

However, when each of the signal strength, the signal to noise ratio, the idle time and the continuous connection time of the connected devices 12A-12C is not within the predetermined range, the processing unit 100 may determine, in step 302F, any one of the connection parameters as a selected connection parameter and may determine whether the selected connection parameter of the connected device is the closest to the corresponding predetermined range.

If the selected connection parameter of the connected device is the closest to the corresponding predetermined range, the processing unit 100 determines, in step 305, the selected connection parameter of the connected device satisfies the removing criterion. If the selected connection parameter of the connected device is not the closest to the corresponding predetermined range, the processing unit 100 may determine, in step 306, the selected connection parameter of the connected device does not satisfy the removing criterion.

For example, the selected connection parameter may be a connection level. The processing unit 100 may determine, in step 302F, whether the connection level of the connected device is the lowest, and may determine, in step 305, the selected connection parameter of the connected device satisfies the removing criterion when the connection level of the connected device is the lowest one.

Similarly, the processing unit 100 performs the selecting rule two in step 303A, and performs decision-making sequentially according to the idle time, the connection level, the signal strength and the signal to noise ratio of the connected device 12A in step 302B to step 302E. The processing unit 100 then determines whether the continuous connection time of the connected device is the closest to the predetermined range (for example, the continuous connection time is the largest one) when each of the connection parameters is not within the predetermined range in step 303F, and determines the continuous connection time of the connected device satisfy the removing criterion in step 305 when the continuous connection time of the connected device is the largest. And when the continuous connection time of the connected device is not the largest, the processing unit 100 determines the continuous connection time of the connected device do not satisfy the removing criterion in step 306.

Similarly, the processing unit 100 performs the selecting rule three in step 304A, and performs decision-making sequentially according to the connection level, the idle time, the signal strength and the signal to noise ratio of the connected device 12A in step 304B to step 304E. The processing unit 100 then determines whether the continuous connection time of the connected device is the closet to the predetermined range (for example, the continuous connection time is the largest one) when each of the connection parameters is not within the predetermined range in step 304F, and determines the continuous connection time of the connected device satisfy the removing criterion in step 305 when the continuous connection time of the connected device is the largest. And when the continuous connection time of the connected device is not the largest, the processing unit 100 determines the continuous connection time of the connected device do not satisfy the removing criterion in step 306.

After the processing unit 100 determined the connected device having the connection parameters satisfy the removing criterion, the flow returns to step 204 in FIG. 2, the processing unit 100 removes the connected device physical addresses of the connected devices 12A-12C, which satisfy the removing criterion, from the address table 101.

In step 205, the processing unit 100 adds the physical address of the remote device 14 to the address table 101.

In an embodiment, after step 205 is performed, the processing unit 100 further records the connection parameters of the remote device 14 and admits the remote device 14 to transmit packets via the wireless hotspot device 10.

When the physical address of the remote device 14 is determined to be in the address table 101 in step 201, the remote device 14 is also a connected device. At the same time, the processing unit 100 updates the connection parameters of the remote device 14 in step 206, and admits the remote device 14 to transmit packets via the wireless hotspot device 10.

When the capacity of the address table 101 is determined to be smaller than the threshold value in step 202, the processing unit 100 records the physical address of the remote device 14 in the address table 101 in step 207 and stores the connection parameters of the remote device 14.

It should be noted that, the method of removing the physical address of the connected device from the address table 101 according to the selecting rule is just an embodiment for illustration. In other embodiments, the processing unit 100 of the wireless hotspot device 10 may determine a removable connected device according to the connection parameter of the connected device through different methods. For example, the connected device satisfied the removing criterion may be set by the processing unit 100 to have several connection parameters within the predetermined range. However, the present disclosure is not limited thereof.

The wireless hotspot operation method 200 of the present disclosure may enable the wireless hotspot device 10 to remove the physical address of the connected device efficiently according to the connection parameters of the connected device when the capacity of the address table 101 is insufficient, and admits new remote device 14 to transmit via the wireless hotspot device 10. Also, the data transmission of the remote device 14 is not limited by the capacity of the address table 101 of the wireless hotspot device 10, such that the utilization of the wireless hotspot device 10 is greatly improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless hotspot operation method, applied to a wireless hotspot device, comprising:
   determining whether a physical address of a remote device, wirelessly connected to the wireless hotspot device, exists in an address table, wherein the address table comprises a plurality of entries, and each of the entries is configured to record a connected device physical address of a connected device;
   determining whether a capacity of the address table is larger than a threshold value when the physical address does not exist in the address table;
   retrieving a selecting rule when the capacity of the address table is larger than the threshold value, wherein the selecting rule comprises a determining order of a plurality of connection parameters of the connected device;
   sequentially determining whether each of the connection parameters exists in a corresponding predetermined range according to the selecting rule;
   removing the connected device physical address of the connected device from the address table if one of the connection parameters exists in the corresponding predetermined range; and
   adding the physical address of the remote device to the address table.

2. The wireless hotspot operation method as claimed in claim 1, wherein the selecting rule further comprises determining any one of the connection parameters as a selected connection parameter, and the wireless hotspot operation method further comprises:
   determining whether the selected connection parameter of the connected device is the closest to the corresponding predetermined range when each of the connection parameters is not within the corresponding predetermined range; and
   determining the selected connection parameter of the connected device satisfying the removing criterion if the selected connection parameter of the connected device is the closest to the corresponding predetermined range.

3. The wireless hotspot operation method as claimed in claim 1, wherein the connection parameters comprise an idle time, a continuous connection time, a signal strength, a signal to noise ratio, a connection level or a combination thereof.

4. The wireless hotspot operation method as claimed in claim 1, wherein when the physical address does not exist in the address table and the capacity of the address table is smaller than the threshold value, the wireless hotspot operation method further comprises:
   recording the physical address of the remote device in the address table; and
   storing the connection parameters of the remote device.

5. The wireless hotspot operation method as claimed in claim 1, wherein when the physical address exists in the address table, the wireless hotspot operation method further comprises:
   updating the connection parameters of the remote device.

6. The wireless hotspot operation method as claimed in claim 1, wherein the physical address is a media access control (MAC) address.

7. The wireless hotspot operation method as claimed in claim 1, wherein the address table is stored in a cache memory.

8. The wireless hotspot operation method as claimed in claim 1, wherein the wireless hotspot device is integrated in a cable modem or a cable modem router.

9. The wireless hotspot operation method as claimed in claim 1, wherein the address table is a content addressable memory (CAM) table.

* * * * *